Patented Mar. 8, 1938

2,110,199

UNITED STATES PATENT OFFICE 2,110,199

TERTIARY NONAROMATIC AMINES AND METHODS FOR PRODUCING SAME

Wallace Hume Carothers, Arden, Del., assignor to E. I. du Pont de Nemours & Company, Wilmington, Del., a corporation of Delaware No Drawing. Application July 3, 1934, Serial No. 733,607

7 Claims. (Cl. 260—43)

This invention relates to tertiary non-aromatic amines and methods for producing them. More specifically it relates to the production of tertiary non-aromatic amines from monovinylacetylene, formaldehyde and secondary non-aromatic amines. Still more specifically it relates to the products produced from these tertiary non-aromatic amines.

It is an object of this invention to produce new and useful tertiary amines. A further object of the invention is to produce highly unsaturated tertiary amines by condensing monovinylacetylene with formaldehyde or one of its polymers, such as paraformaldehyde, and a secondary non-aromatic amine. A still further object of the invention is to react these tertiary amines, so produced, with hydrogen and hydrogen chloride. Other objects will appear hereinafter.

These objects are accomplished by reacting monovinylacetylene with formaldehyde, or one of its polymers, such as paraformaldehyde and a secondary non-aromatic amine in solution in an autoclave at about 100° C. The highly unsaturated tertiary non-aromatic amines produced in this way are colorless liquids, having persistent odors and being susceptible to further treatment, such as hydrogenation and reaction with hydrogen chloride to form additional new compounds.

In order that the invention may be better understood the following specific examples, in which the parts are given by weight, are included. These examples are not to be construed as limiting the invention, however.

Example 1

An autoclave was charged with 780 parts of monovinylacetylene, 437 parts of paraformaldehyde, 657 parts of dimethylamine, and 1830 parts of dioxan. The autoclave was heated for 16 hours at 50° C. and then for 12 hours at 95–100° C. The tertiary amine product was separated from the reaction mixture by fractional distillation under diminished pressure, the dioxan and residual secondary aliphatic amine distilling first, and finally the tertiary amine. The product was vinylethinylmethyl(dimethyl)amine, $(CH_3)_2NCH_2C\equiv CCH=CH_2$, a colorless sternutatory liquid boiling at 133–5° C./752 mm., 82° C./116 mm.;

$n_D^{20}$, 1.4700; $d_4^{20}$, 0.8208

The yield was 74% of theory. This product readily formed an oxalate and the white crystals obtained by recrystallization melted at 140/142° C.

The tertiary amine reacts readily with hydrochloric acid to form a hydrochloride (salt) and then, more slowly, hydrogen chloride adds to the unsaturated system giving rise to a derivative of chloro-2-butadiene-1,3. This second reaction is strongly catalyzed by the presence of cuprous chloride. The reaction is illustrated in the following example; 55 parts of vinylethinylmethyl-(dimethyl)amine was dissolved with cooling, in 200 parts of 38% hydrochloric acid containing 5 parts of cuprous chloride. The solution was heated at 60° C. during 16 hours, and was then added dropwise, with cooling, to a solution of 112 parts of potassium hydroxide in 200 parts of water. The insoluble hydrochloride addition product was separated, dried, and distilled. There was received 42 parts of colorless product representing a 58% yield. Its physical constants were found to be: B. P., 56–58° C./11 mm.;

$n_D^{20}$, 1.4895; $d_4^{20}$, 0.9615

The formula of this product was probably

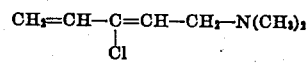

which would make it dimethylamino-1-chloro-3-butadiene-2,4.

The vinylethinylmethyl(dimethyl)amine in the absence of cuprous chloride combines with hydrogen chloride at the unsaturated linkages only very slowly; the product being chiefly a tar with about 10% of the above described addition product.

Example 2

A reaction tube was charged with 26 parts of monovinylacetylene, 15 parts of paraformaldehyde, 23 parts of dimethylamine and 50 parts of the dimethyl ether of diethylene glycol. The reaction vessel was heated for 12 hours at 100° C. Upon recovery of the product as described in Example 1, a 55% yield of vinylethinylmethyl-(dimethyl)amine was obtained.

Example 3

A charge consisting of 23 parts of monovinylacetylene, 15 parts of paraformaldehyde, 32 parts of diethylamine, and 60 parts of dioxan was placed in an autoclave and heated for 15 hours at 100° C. The product was separated from the reaction mixture by distillation under reduced pressure, and a 91% yield of vinylethinylmethyl(diethyl)amine $(C_2H_5)_2NCH_2C\equiv CCH=CH_2$, was obtained. The product was a colorless liquid, with a persistent odor and had the following properties; B. P., 166–167° C./766 mm., 88–89° C./51 mm.;

$$n_D^{20}, 1.4710; d_4^{20}, 0.8272$$

The amine readily formed a picrate in hot ethanol, and the purified crystals melted at 84–85° C.

An amine hydrochloride was formed by passing dry hydrogen chloride into a solution of vinylethinylmethyl(diethyl)amine in anhydrous ether. The purified hydrochloride melted at 122–124° C.

Thirty-four parts of vinylethinylmethyl(diethyl)amine in 95 parts of absolute ethanol absorbed 1.51 parts of hydrogen (107% of theory) during 30 minutes employing a platinum catalyst (0.2 part). The catalyst was removed by filtration and 24 parts (or 67% of the theoretical yield) of a colorless oil was obtained and identified as n-amyl-di-ethylamine. Its constants were found to be: B. P., 155–157° C./760 mm., 64–65° C./28 mm.;

$$n_D^{20}, 1.4250; d_4^{20}, 0.7663$$

The picrate of this amine readily formed in hot ethanol, and the purified product melted at 52–53° C.

*Example 4*

An autoclave was charged with 23 parts of monovinylacetylene, 15 parts of paraformaldehyde, 38 parts of piperidine, and 60 parts of dioxan. The autoclave was heated for 15 hours at 100° C. after which the product was separated from the reaction mixture by fractional distillation under reduced pressure. A 68% yield of N-(vinylethinylmethyl)-piperidine, $$(CH_2)_5NCH_2C{\equiv}CCH{=}CH_2,$$

was obtained. It was a colorless liquid with a piperidine-like odor and had the following properties; B. P., 207–209° C./766 mm. with some decomposition; 91–94° C./14 mm.;

$$n_D^{20}, 1.5064; d_4^{20}, 0.9069$$

The picrate of the amine formed readily and melted at 95–96° C. after purification.

Seventy-five parts of N-(vinylethinylmethyl)-piperidine were dissolved with cooling in 200 parts of 38% hydrochloric acid containing 5 parts of cuprous chloride. The solution was allowed to stand for 66 hours at 35° C. and was then heated at 60° C. during 5 hours. The amine was liberated by dropwise addition (with cooling) to an aqueous solution containing 112 parts of potassium hydroxide. After ether extraction of the solution, drying and distillation, there was obtained a 56% yield of the hydrochloride of N-(vinylethinylmethyl)-piperidine with the physical constants: B. P., 90–92° C./3.5 mm.;

$$n_D^{20}, 1.5193; d_4^{20}, 1.0137$$

The formula of this product was probably:

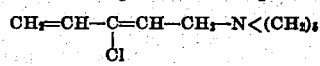

which would make it N-piperidyl-1-chloro-3-butadiene-2,4.

Thirty parts of N-(vinylethinylmethyl)-piperidine in 50 parts of absolute methanol absorbed 1 part of hydrogen (85% of the amount required by theory) during 40 minutes employing 0.2 part of platinum catalyst. After removing the catalyst by filtration and fractionally distilling the reaction mixture, there was obtained 25 parts of N-n-amylpiperidine (80% yield). Its constants were found to be: B. P., 192–195° C./760 mm., 77–80° C./13 mm.;

$$n_D^{20}, 1.4602; d_4^{20}, 0.8412$$

The picrate of the product formed readily in hot ethanol, and after recrystallization melted at 100–101° C.

*Example 5*

Eighty-three parts of monovinylacetylene, 47 parts of paraformaldehyde, 290 parts of dicyclohexylamine, and 125 parts of dioxan were charged into an autoclave and heated for 14 hours at 100° C. Fractional distillation of the reaction product under reduced pressure gave the new compound vinylethinylmethyl(dicyclohexyl)amine, $$(C_6H_{11})_2NCH_2C{\equiv}CCH{=}CH_2.$$

The product was a pale yellow liquid with a pungent odor and had the following properties; B. P., 138–140° C./0.5 mm.;

$$n_D^{20}, 1.5191; d_4^{20}, 0.9492.$$

As starting materials in carrying out this invention I may employ with the monovinylacetylene either formaldehyde or one of its polymers, such as paraformaldehyde, together with any secondary non-aromatic amine. In addition to the secondary amines given in the examples, I may use with similar results other secondary amines, such as pyrrolidine, methylethylamine, dibutylamine, methylamylamine, methylcyclohexylamine, and dipropylamine. The products prepared according to this invention have the following formula:

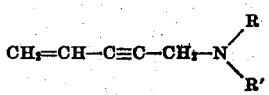

in which R and R' are non-aromatic radicals. It is to be noted that in some cases R and R' are joined, for example, when the secondary amine employed in the reaction is piperidine.

The proportion of the various reactants may be varied over a rather wide range. Reaction is between equimolal proportions but the reaction is not inhibited by an excess of one reactant. The invention will, therefore, include the use of varying proportions in the reaction mixtures.

The reaction is preferably carried out in solution in an inert solvent, miscible with the reactants and with water but non-reactive toward the ingredients of the reaction mixture. The solvents which may be used include, for example, methyl ether of ethylene glycol, ethyl ether of ethylene glycol and those mentioned in the examples, i. e., dioxan and dimethyl ether of diethylene glycol. The preferred amount of solvent is that amount necessary to bring about complete solution. Greater or less amounts may, however, be used.

It will be noted that in some of the examples the reactants were held at a temperature of about 50° C. for some time. This was done to allow dissipation of the heat generated by the reaction of the secondary aliphatic amines with the paraformaldehyde and to so prevent a temperature rise above that desired finally. The condensation reaction proceeds slowly at temperatures below 100° C., but to increase the speed of reaction it is desirable to maintain a temperature as high as possible without decomposition of reactants. The upper limit of temperature is determined by the decomposition temperature of the acetylenic reactant at the pressure used.

For monovinylacetylene this temperature is about 110° C. at atmospheric pressure. The time of heating is determined somewhat by the particular reaction. Usually, the time will be between 10 and 20 hours to complete the reaction. The end point of the reaction may be determined by removing small samples from the reaction mixture and determining their composition. Excessive heating favors polymerization and should be avoided.

Although in the examples no higher pressure was employed than that resulting when the reactants were heated (about 100 lbs. per sq. inch), it is possible to carry out the reactions under higher pressures if desired, especially if pressure is necessary to keep the reactants in the liquid phase. However, the well known tendency of acetylenic compounds to become unstable under certain conditions, makes operation at high pressures dangerous.

As is evident from the examples the amines produced by the condensation readily absorb hydrogen in the presence of a hydrogenation catalyst. This hydrogenation reaction is preferably carried out in a solution in the presence of a platinum catalyst. Other hydrogenation catalysts may be used, however.

The vinylethinylmethyl amines produced by the process of this invention constitute a new class of compounds. They are colorless liquids having a persistent odor and are suitable for various uses in the arts, for example, for use as insecticides, antioxidants, gum and polymerization inhibitors, rubber accelerators, and the like. The lower members of this class of tertiary amines, that is those formed by the use of the lower alkyl amines, for example, dimethylamine, diethylamine, can be distilled at atmospheric pressure without decomposition. The reactions which these tertiary amines undergo are varied. By hydrogenation they are readily converted to the corresponding saturated tertiary amine. When treated with HCl in the presence of $Cu_2Cl_2$, at preferably 60° C. they form a distillable mono-hydrochloride of the general formula:

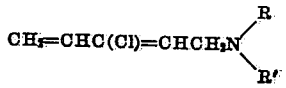

In the absence of cuprous chloride, addition of HCl to the unsaturated bonds takes place to only a slight extent. Compounds of this class are capable of very slow polymerization. With para-thiocresol these vinylethinylmethyl amines form addition products corresponding to the general formula:

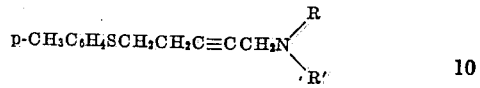

These also are useful as insecticides, accelerators, and the like.

It is apparent that many widely different embodiments of this invention may be made without departing from the spirit and scope thereof and, therefore, it is not intended to be limited except as indicated in the appended claims.

I claim:
1. A compound having the general formula:

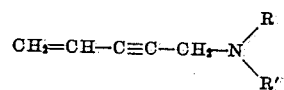

in which R and R' are alkyl radicals.
2. Vinylethinylmethyl(dimethyl)amine.
3. Vinylethinylmethyl(diethyl)amine.
4. N-(vinylethinylmethyl)-piperidine.
5. A compound of the formula

in which X is a radical which results upon the removal of the amino hydrogen from a secondary non-aromatic amine.
6. A compound of the formula

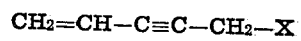

in which X is a radical which results upon the removal of the amino hydrogen from a secondary non-aromatic amine and which contains one nitrogen atom and is otherwise composed of carbon and hydrogen.
7. A compound of the formula

in which X is a 1-piperidyl group.

WALLACE H. CAROTHERS.